United States Patent
Wooten (10) Patent No.: US 7,225,287 B2
(45) Date of Patent: May 29, 2007

(54) SCALABLE DMA REMAPPING ON A COMPUTER BUS

(75) Inventor: David Rudolph Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 91 days.

(21) Appl. No.: 11/142,514

(22) Filed: Jun. 1, 2005

(65) Prior Publication Data

US 2006/0277348 A1    Dec. 7, 2006

(51) Int. Cl.
G06F 13/36    (2006.01)
G06F 13/00    (2006.01)

(52) U.S. Cl. .......................... 710/309; 710/26
(58) Field of Classification Search .................... 710/2, 710/3, 22
See application file for complete search history.

(56) References Cited

U.S. PATENT DOCUMENTS

| | | | | |
|---|---|---|---|---|
| 5,329,629 A | * | 7/1994 | Horst et al. | 711/5 |
| 5,561,780 A | * | 10/1996 | Glew et al. | 711/126 |
| 6,029,224 A | * | 2/2000 | Asthana et al. | 711/5 |
| 6,449,714 B1 | * | 9/2002 | Sinharoy | 712/240 |
| 6,851,036 B1 | * | 2/2005 | Toda et al. | 711/202 |
| 2004/0160835 A1 | * | 8/2004 | Altman et al. | 365/200 |
| 2005/0273574 A1 | * | 12/2005 | Lin | 711/207 |

* cited by examiner

*Primary Examiner*—James K. Trujillo
*Assistant Examiner*—Mohammed Rehman
(74) *Attorney, Agent, or Firm*—Woodcock Washburn LLP (57) ABSTRACT

A system for addressing bus components comprises a bus controller component that controls access between a CPU and a memory address space. A plurality of bus components connected to said bus controller over a bus are addressable via a memory mapped address within the address space. An address translation table is stored on at least one of the plurality of bus components. The bus translation table stores a translation between a virtual address and a real address.

20 Claims, 8 Drawing Sheets

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | Fmt X 1 | | Type | | | | | R | | TC | | | Reserved | | | TD | EP | Attr | | AT | | | | Length | | | | | | | |
| Requester ID | | | | | | | | | | | | | | | | Tag | | | | | | | | Last DW BE | | | | 1st DW BE | | | |
| Address 63:32 | | | | | | | | | | | | | | | | | | | | | | | | | | | | | | | |
| Address 31:02 | | | | | | | | | | | | | | | | | | | | | | | | | | | | | | | R |

Fig. 5

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| R | Fmt X 0 | | Type | | | | | R | | TC | | | Reserved | | | TD | EP | Attr | | AT | | | | Length | | | | | | | |
| Requester ID | | | | | | | | | | | | | | | | Tag | | | | | | | | Last DW BE | | | | 1st DW BE | | | |
| Address 31:02 | | | | | | | | | | | | | | | | | | | | | | | | | | | | | | | R |

| +0 | | | | | | | | | +1 | | | | | | | | | +2 | | | | | | | | | +3 | | | | | | | |
|---|---|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | | 7 | 6 | 5 | 4 | 3 | 2 | 1 | 0 | | 7 | 6 | 5 | 4 | 3 | 2 | 1 | 0 | | 7 | 6 | 5 | 4 | 3 | 2 | 1 | 0 |
| Virtual Address [63:32] (big endian) ||||||||||||||||||||||||||||||||| |
| Virtual Address [31:12] |||||||||||||||||||||| x | x | x | x | x | x | x | x | x | x | x | x |

Fig. 12

| +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| Fmt | | Type | | | | | | 0 | TC | | | 0 | 0 | 0 | 0 | T D | E P | Attr | | | 0 | TM | | 0 | 0 | 0 | 0 | 0 | 0 | 0 | 0 |
| 0 | 1 | 1 | 0 | 0 | 1 | 0 | 0 | | | | | | | | | | | 0 | 0 | | | 0 | 1 | | | | | | | | |
| Requester ID ||||||||||||||||| Tag |||||||| 0 | 0 | 0 | 0 | 0 | 0 | 1 | 0 |
| Device ID ||||||||||||||||| Extra Data |||||||||||||||||

SCALABLE DMA REMAPPING ON A COMPUTER BUS

FIELD OF THE INVENTION

The present invention relates to computer systems, and more particularly, to systems and methods for communicating over a hardware bus in a computer system.

BACKGROUND OF THE INVENTION

In a computer architecture, a bus provides an interconnection of the various components and devices coupled to the system (e.g., CPU, memory, peripherals, and other external computing devices) and generally carries some combination of power, data, and commands among the components. There are varieties of bus types and all buses fall into one of two categories: serial or parallel. Some examples of parallel buses include ISA, Microchannel, AGP, and so on. Some examples of serial buses include PCI express, SPI bus, and so on.

In most common personal computers, a core logic chipset routes input and output (I/O) traffic among the various components and devices coupled to the system. The core logic chipset is typically split into two parts: the North Bridge and the South Bridge. The CPU, and the main memory are connected together by the North Bridge and communicate via a front side bus. The North Bridge may also connect to other devices attached to various bus interfaces including, PCI, PCI Express, AGP, and so on. The North Bridge is also connected to the South Bridge, the secondary bridge that routes traffic to and from an assortment of I/O devices on the system, e.g., hard disk drives, Ethernet ports, and so on. The traffic from these devices goes through the South Bridge to the North Bridge and then on to the CPU and/or memory.

Many systems use a PCI bus to connect devices to the system. PCI uses a shared bus topology in which all of the different PCI devices communicate with the CPU over the same bus physical connections. Increasingly, systems are switching to PCI Express which uses point-to-point connections between devices to provide greater bandwidth and device isolation. As with PCI, PCI Express devices are able to initiate memory reads and writes (DMA).

Systems based on x86 processors currently program DMA devices using physical memory addresses. This has limitations in making the system secure. A preferable way to handle this is to have a means of translating addresses from DMA devices so that the DMA device can be constrained to work in a more restricted address space. Intel and others are in the process of adding DMA remapping capability to the "central complex" (e.g. the North Bridge, the CPU and memory). Virtual addresses from DMA devices will be translated by logic in the central complex before being presented to the memory system. So that it is not necessary to do an expensive (in time) table lookup every time a virtual DMA address is presented, it is expected that the central complex will be able to cache some number of the translations so that they can be found quickly without reference to memory tables. The address translation cache is often called a Translation Look-aside Buffer or TLB. The TLB would be included in the chipset along with the engine that performs the translation. The problem with this approach is that it is difficult to design the TLB in the central complex to be the right size for all applications. In some systems, the TLB can be fairly small as the number of DMA devices is small and their rate of DMA is low. In other systems, the number of DMA devices is large and their access rate is very high. Each of these different system types requires a different size of TLB.

SUMMARY OF THE INVENTION

The present invention provides a system for adding TLB's to bus components allowing the total number TLB entries in the system to scale with the IO needs of the system. The system comprises a bus controller component that controls access between a CPU and a memory address space. A plurality of bus components are connected to the bus controller over a bus such as a PCI-express bus. The bus components are addressable by way of a memory-mapped address within said address space. An address translation table is stored on at least one of said plurality of bus components. The bus translation table stores a translation between a virtual address used by the DMA device and a real address in system memory.

An address translation engine translates the virtual address from a DMA device to a corresponding real address using the stored translation in the translation table. Preferably, an address translation table storing a translation between a virtual address and a real address can be dynamically modified to allow translations for added bus components or changes to the translations. The results of the translation performed by the address translation engine may be communicated to the DMA device for storage in the TLB of the DMA device. If a subsequent DMA by the device uses an address that is translated by one of the device's TLB entries, then the conversion from virtual to physical can be made at the DMA device eliminating the need to translate the address at the system memory. The TLB can be on the DMA device or in or on another component in the system that is in the DMA path between the device and system memory such as a PCI Express switch. Preferably, the address translation engine communicates the translation to the plurality of bus components by way of a message packet.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

The system described herein moves data between devices on a bus and system memory. The movement is done through a DMA process that relies on one or more address translation tables. The number of address translation tables can be changed dynamically based on system needs.

Figure 1:
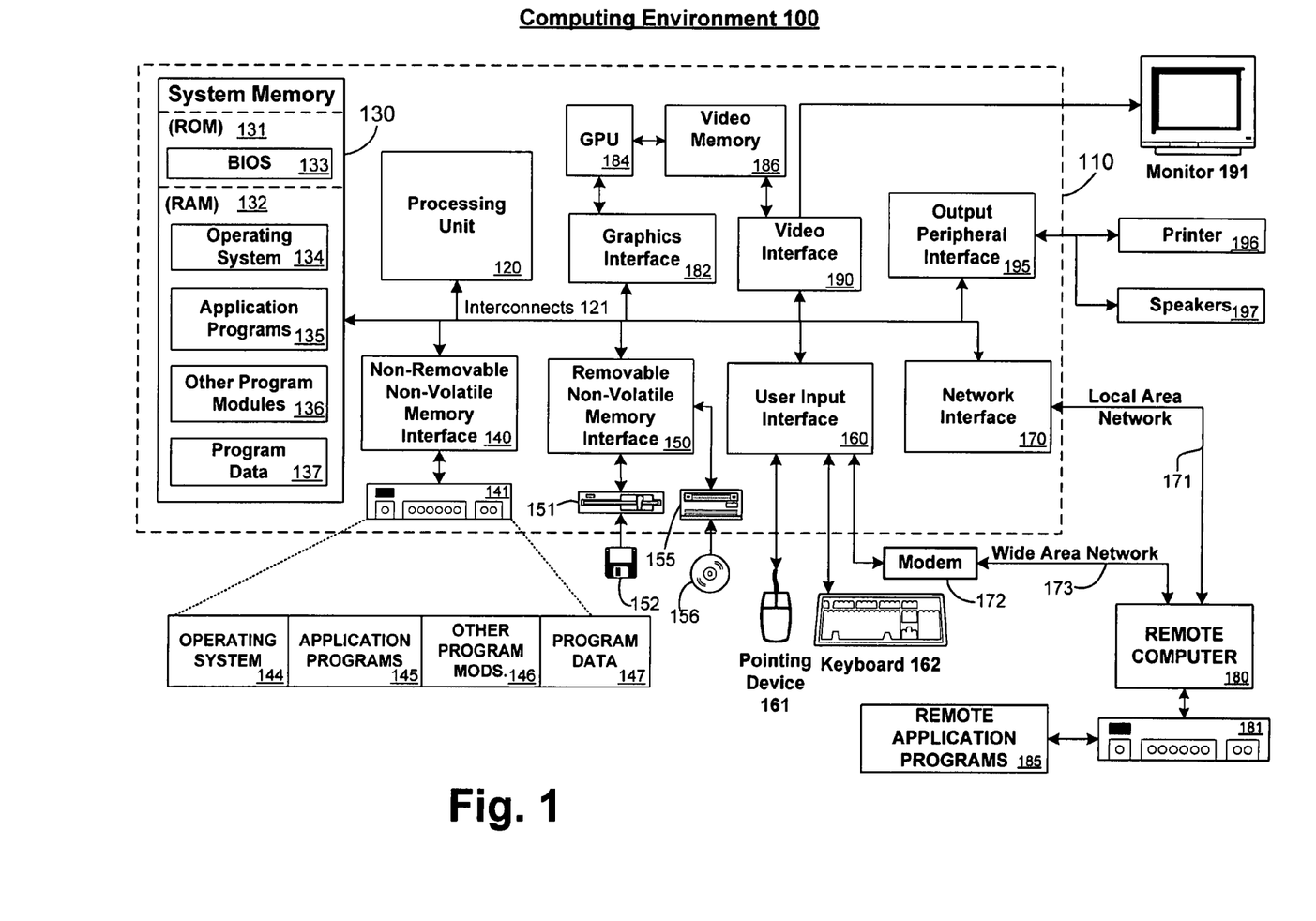
FIG. 1 is a block diagram of an example of a computer environment in which aspects of the present invention may be implemented.

FIG. 1 and the following discussion are intended to provide a brief general description of a suitable computing device in connection with which the invention may be implemented. FIG. 1 thus illustrates one example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and interconnects 121 that couple various system components including the system memory to the processing unit 120 and/or facilitate communication among various components of computer 110. Interconnects 121 may comprise one or more different buses and bus types that interconnect the various components together in any number of different ways and is not intended to imply that a single bus type or even a single bus connects the various components together. Interconnect 121 may include several types of bus structures including a memory bus or memory controller, a peripheral bus, and a local bus using any of a variety of bus architectures. By way of example, and not limitation, such architectures may include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express and buses similar to PCI Express.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. Although a system may start up from information stored in ROM 131, it should be recognized that a system may also start up remotely by way of a computer network. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically interconnected through a non-removable memory interface such as interface 140, and magnetic disk drive 151 and optical disk drive 155 are typically interconnected by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to interconnect 121, but may be connected by other interface and bus structures, such as a parallel port, game port or a universal serial bus (USB). A graphics interface 182 may also be interconnected to the system. One or more graphics processing units (GPUs) 184 may communicate with graphics interface 182. A monitor 191 or other type of display device is also interconnected to the system via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. Moreover, computer 110 may be a client, server, or peer computer in a networked environment. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

Figure 2:
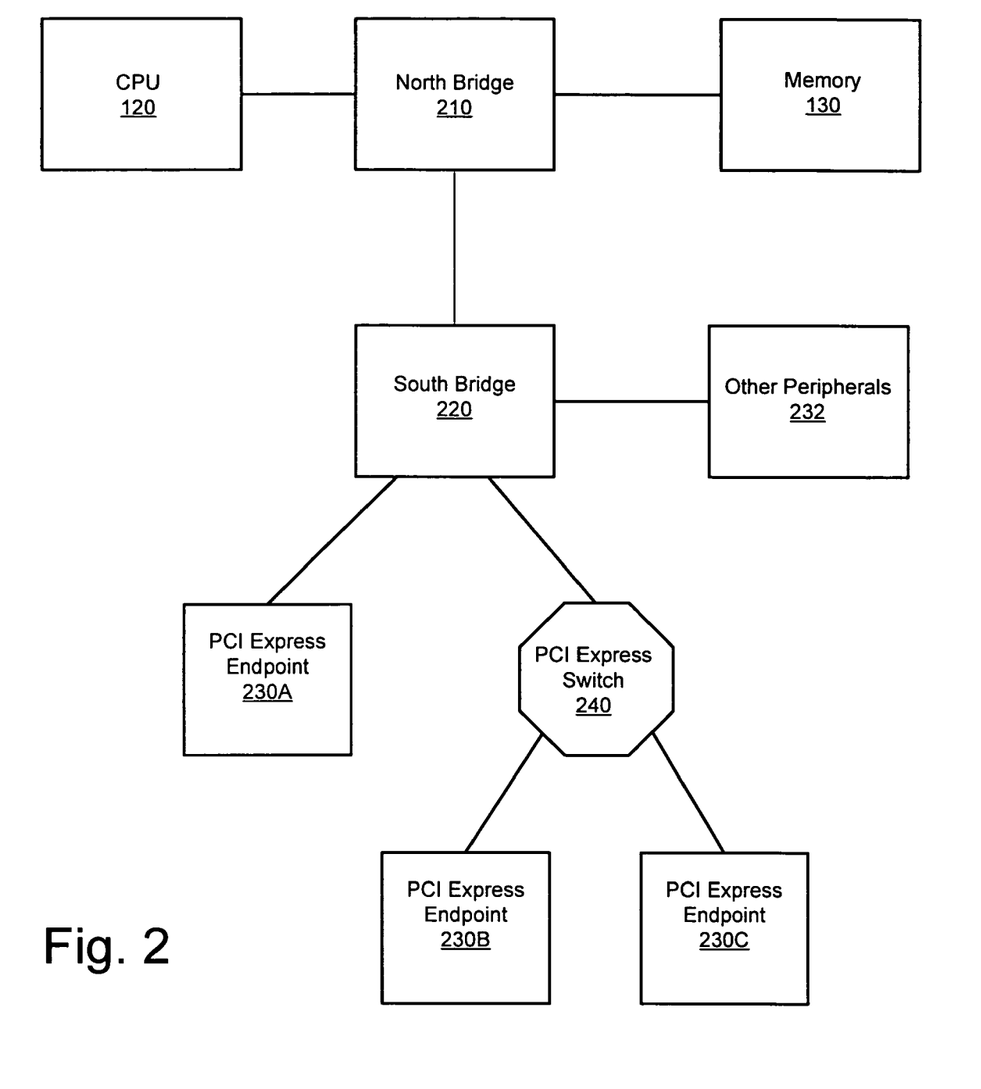
FIG. 2 is a block diagram providing further details regarding aspects of a system bus of the computer environment of FIG. 1.

FIG. 2 further illustrates an aspect of an embodiment of the invention. Here CPU 120 communicates with system memory 130 and other components via the North Bridge 210. Moreover, the North Bridge 210 is coupled to a south bridge through which it maintains access to the various buses and peripherals on the system. In this example system, the South Bridge 220 has control over a PCI Express bus and other peripherals that may be connected to a bus type different from PCI Express, e.g., Other Peripherals 232. The PCI Express bus may have a number of PCI Express Endpoints, e.g., Endpoints 230A, 230B, and 230C. In this example, Endpoints 230B and 230C are coupled to the South Bridge 220 by way of a PCI Express Switch 240.

Figure 3:
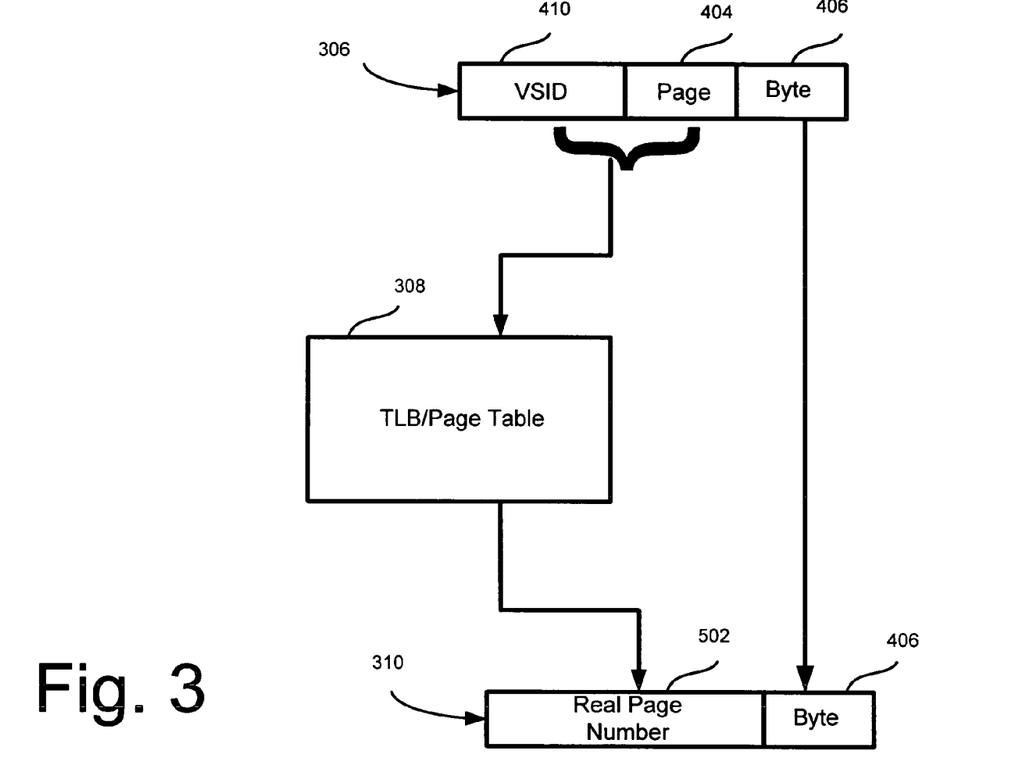
FIG. 3 illustrates an exemplary memory translation between a virtual address space and a real address space using a address translation cache or translation table lookup.

The North Bridge 210 has the additional responsibility of routing memory reads and writes between the CPU and PCI Express bus devices, and PCI Express bus devices to system memory. As noted above, PCI Express bus devices are assigned memory address spaces and are address by the CPU, for example, as if they are part of its memory space. That memory management is generally performed by the North Bridge 210 which takes advantage of various addressing schemes that translate a virtual address space into a physical address space. FIG. 3 generally describes address translation and helps to illustrate the address translation that may be performed by the North Bridge 210. As used herein, the address translation for virtual to real addressing could be done when converting from a virtual address space to a physical address space when a CPU accesses a device or memory or when a PCI Express device accesses memory. The North Bridge need not be the locus of translation for either the CPU or the DMA devices. Address translation may also be accomplished by any system component that is in the path between the DMA device and system memory.

Referring to FIG. 3, a virtual address 306 is converted into a real or physical address 310 through one or more address conversion means such as a Translation Lookaside Buffer (TLB) 308. A program generally operates in a contiguous address space (referred to herein as virtual address space); however, the physical address space must accommodate and be shared by a number of applications and perhaps even a couple of different operating systems such as in a virtual machine environment. As such, physical address space is managed by the system and may contain any number of different programs or portions of programs and devices. To resolve the needs of the various programs, a system allows a program to operate in an address space that appears to be contiguous but which is managed by a memory management unit that tracks the physical location of the devices, programs and data.

As noted previously, the virtual address needs to be translated to a physical address for an instruction fetch or for a memory access. An address translation mechanism attempts to convert that virtual address 306 to a real address 310 which is then used to access memory 130. The virtual to real translation employs the use of a TLB/page table 308.

When performing a virtual-to-real conversion, the address is sent to the TLB and, if there is a miss in the TLB, the address is sent to the page table for lookup. If there was a hit in the TLB, then the TLB contains the address and no further lookup is required. The TLB is a portion of the page table that is cached.

Conceptually, the TLB 308 is searched by the address relocation hardware to translate every reference. The hardware usually keeps page table entries that have recently been used in the TLB 308 to increase system performance. When a translation is not available in TLB 308, then at least a portion of TLB 308 is swapped out for the portion of the page table that contains the proper translation. The page table may be stored in RAM 132 or the page table may not be a table but rather may be an algorithm that generates pages as needed. Under that arrangement, when an address translation is not found in the TLB 308, a new set of TLB entries can be generated and used to update the entries in TLB 308.

Virtual Space Identifier (VSID) 410, and virtual page number 404 form a fully qualified virtual page address for which the translation hardware attempts to find a matching entry in TLB 308. If a match is found, then TLB 308 maintains a corresponding real page number 502. The real page number 502 forms the higher order bits of the real address. The byte address information 406 is translated directly from the virtual address 306. For translations done by the CPU, the VSID 410 is often an index that is loaded into one of the translation control registers when the processor context changes.

The above memory mapping describes the use of page tables and TLB's that are commonly associated with CPU memory access. For use of the TLB notion with respect to illustrating the embodiment of the invention, the term address translation cache (ATC) is used to avoid confusion with the TLB of a typical memory management unit. An aspect of the invention is to use one or more translation agents, i.e., entities that convert addresses expressed in terms of one address space into an address in a different address space. The translation agent (TA) is associated with memory that contains translation tables that the TA will reference to convert a virtual address from a DMA device into a physical memory address. A TA may contain an ATC. Each TA should have an ATC collocated with it, but an ATC need not be collocated with a TA. In essence, the ATC works in the manner of a TLB. That is, it provides for the translation of virtual addresses to real addresses.

Figure 4:
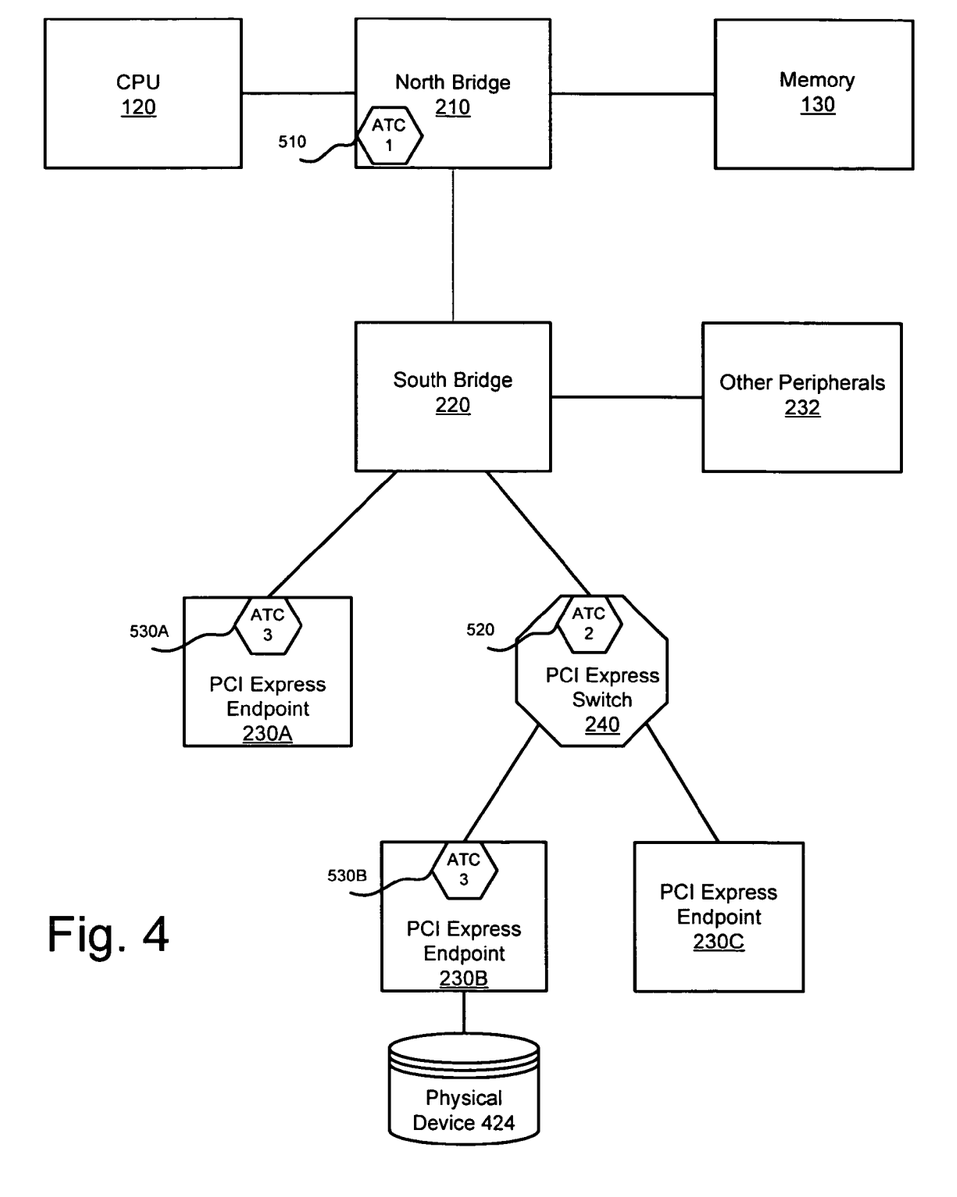
FIG. 4 is a block diagram providing multiple address translation caches distributed among bus components.

FIG. 4 further illustrates the notion of multiple ATC's that are used by the TA to perform address translation. As shown, the system now has multiple ATC's (510, 520, 530A and 530B) distributed over the PCI Express system. ATC 1 510 is associated with North Bridge 210, ATC 2 520 is associated with PCI Express Switch 520, and ATC 3 is associated with a PCI Express Endpoint devices 530A and 530B. PCI Express Endpoint device 230C has no associated ATC.

The translation mechanism allows for scalability of resources used for translation. In particular, the amount of memory used for ATC's is scalable. In most implementations of a TA, it is expected that there will be a limited set of entries in the ATC of the TA. The number of entries in the ATC will likely not be adequate for all applications. Invariably, whatever size is chosen for the ATC in the TA will prove to be either too large (and wasteful) or too small (and low performance).

Scaling of the translation is complicated by the need to keep increases in access latency within the jitter bounds of accesses that are made using centralized translation. If the memory containing a translation table is not close (in latency terms) to the entity doing the translation (the translation agent or TA), then the latency associated with an access can get rather large. In other words, if a remote entity has to walk the translation tables that are located in central memory, then the translation time can become excessive. This is especially troublesome for systems in which a quality of service guarantee limits the latency that the system can impose. For this reason, it is assumed that the translation tables used by a TA are collocated with the TA.

Conceptually, a very straightforward way of scaling the mapping capabilities of the I/O subsystem is to add translation capabilities outside of the central complex (e.g., outside of the North Bridge 210 as illustrated in FIG. 4). Having multiple engines doing the translation can provide some performance gains. However, if the translation tables are contained in components (e.g., the PCI Express components), then it is desirable to have the format of those tables defined by a standard so that they can be programmed by shrink-wrapped operating systems on any one of a number of CPU environments. It is difficult to define a table format that is suitable for all devices in all operating environments.

An important objective is to allow ATC's to be added to systems that support DMA remapping. This makes it possible to scale the translation cache to fit the system so that small systems don't have to bear the tax of an ATC designed for a large system, and a large system doesn't have to suffer the performance degradation of an overloaded, central ATC.

The ATC's may either be system components (resources shared by many devices) or located on a device (the specific benefit of locating the translation memory on the device is that the device can pre-fetch translations and minimize translation latency for time-critical transactions).

To allow an ATC to interact with a TA that is not collocated, it is important that packet formats used for this interaction be standardized, allowing the TA and ATC(s) to be provided by different vendors. For PCI Express, it is proposed that memory requests use some of the reserved fields to tag the access type to support these interactions. Additionally, new message types may be defined to support management of TA's and remote ATC's.

A TA does translations. An ATC can cache those translations. An ATC need not be collocated with a TA. The below description illustrates the use of an ATC that is not an integral part of a TA but is "downstream" of a TA. The standardization of the interface to this ATC allows consistent behavior and interoperability when the TA hardware is from a different vendor than the ATC hardware vendor. However, the below description is merely one example format that illustrates the general principle of having multiple ATC's that communication via message passing to enable multiple ATC's and TA's to act together to perform address translation.

Figure 5:
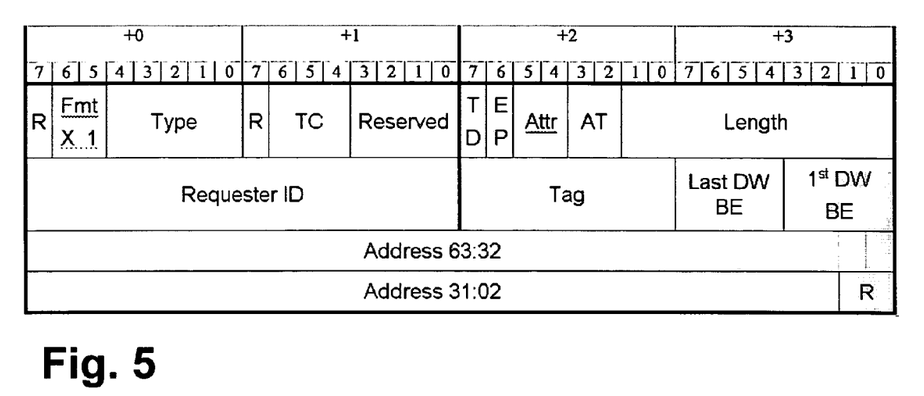
FIGS. 5, 6, 7, 8, 9, 10, 11, and 12 illustrate a number of example PCI Express message formats for communicating among and controlling the address translation caches.
Figure 6:
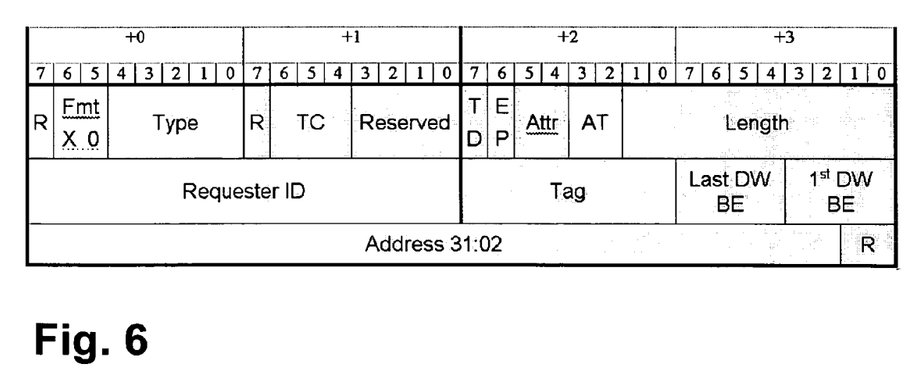

To enable the tagging of the address type of the requests, a previously reserved field in the memory request transaction is used. The modified format of the request is shown in the FIGS. 5 and 6 with the new field ("AT") highlighted. FIG. 5 is an example of a Memory Request with 64-bit Address. FIG. 6 is an example of a Memory Request with 32-bit Address. The AT field in the transactions is a redefinition of a reserved field in the PCI Express specification. It may be used as follows:

TABLE 1

Address Type (AT) Field Encodings

| AT Coding | Mnemonic | Meaning |
|---|---|---|
| 00b | Default | Depending on its setting, a TA may treat the address as either virtual or physical. No translation response is sent on the PCIe bus. |
| 01b | TranslationRequest | The TA may return the translation of the address. The translated address may be the same as the un-translated address. |
| 10b | Translated | The address in the transaction has been translated by an ATC. If the device is allowed to present physical addresses to the system memory then the TA will not translate this address. Otherwise, this is an error condition. |
| 11b | Illegal | Used by an ATC to tag a request that is received with AT set to Translated if the BusesWithATC bit for the bus is not set in the ATC receiving the request. |

When an ATC is implemented in a switch, two, 256-bit vectors are used to control caching behavior relating to Bus numbers. The first vector (BusesCached) indicates the bus numbers for which the ATC should cache translations. The second vector (BusesWithATC) indicates which bus numbers are associated with a downstream ATC.

In general, the ATC in a switch will use the BusesCached vector to determine if it will attempt to dereference the address in a request received from a downstream bus and whether it should save TranslationResponse messages received from upstream that are addressed to a particular Bus. The Bus number field is a component of the RequesterID field. It is the most significant 8 bits of that field. The next 5 bits are a Device designator indicating one of 32 devices on the indicated Bus. The low-order 3 bits of the RequesterID field indicates which of 8 possible functions on the indicated Device and Bus is issuing the request. The DeviceID has a similar format. If BusesWithATC is not set, the switch ATC will not forward or send TranslationResponse or Invalidate messages to the indicated bus.

The other actions of the ATC vary according to the Address Type of the request that is received on a downstream port.

When an ATC receives a request with the Address Type (AT) field in the request set to Default, it will check its BusesCached vector to see if it should cache entries for the Bus indicated in the RequesterID field of the request. If the ATC does not cache translations for the Bus, then it will pass the request towards to the root complex and not change the AT.

If the ATC is programmed to cache entries for devices on the Bus indicated in the transaction ID, then the ATC will check its memory to determine if it has a cached translation for the indicated address. In doing this check, the RequesterID is used as the VSID 410 and the most significant 52 or 20 bits of the address filed are used as the page 404. If not (a "miss"), then the ATC will change the request address type to TranslationRequest and forward the request. If the ATC contains a translation, it will change address field of the request, set the AT field to Translated and forward the message toward the root complex.

When a request with TranslationRequest arrives at an ATC, the ATC will initially process the request as if AT was set to Default (including forwarding the request without change if BusesCached is not set for the Bus in RequesterID). If the translation is in the ATC, the ATC will check BusesWithATC. If the bit corresponding to the RequesterID Bus is set, then the ATC will send a TranslationResponse message to the requester. If the bit is not set, then no TranslationResponse message is sent.

When Translated request arrives at an ATC in a switch, the ATC will check BusesWithATC. If the bit corresponding to the bus number in RequesterID is set, then the request is forwarded towards the root complex without modification. If the bit is not set, then the ATC will change the AT to Illegal and forward the request to the root complex.

The ATC responds to different types of invalidation commands. The ATC can be invalidated by specific mapping, by Bus/Dev/Fn, by Bus/Dev, by Bus, or in entirety.

When an entry in the translation memory is changed, and that entry may be in an ATC, then system software will send an invalidate command to the TA, The TA will invalidate any entries it has in its ATC and send an invalidation to any downstream ATC that might have cached the invalidated entry. The TA may only send invalidates for the Bus numbers that have BusesWithATC set.

When a downstream ATC in a switch receives an invalidate message, it will check its cache and invalidate the indicated locations. If BusesWithATC is set for the indicated Bus number, it will forward the Invalidate message downstream.

If the ATC does not forward the Invalidate Message, then when it completes invalidation of the indicated entries from its memory, then it will send an InvalidateComplete message upstream to the TA.

If a device needs to prefetch a translation, it may send a "Touch" request. This request is a normal read or write request with AT set to TranslationRequest, Length set to "1" and first ($1^{st}$) DW Byte Enable set to 0000b. This results in no memory access. An "upstream" ATC or the TA in the root complex will return the requested translation if the bus associated with the request is valid for the access type of the request. Otherwise, the ATC will return a TranslationResponse with RW set to 00b.

The messages from a TA to downstream ATC's use a pair of previously reserved bits to flag the messages as being for a downstream ATC and not the addressed device. The flag bits (ATC Message—TM) occupy the same location in the header as the bits used to indicate the Address Type for memory request sent by the ATC.

Figure 7:
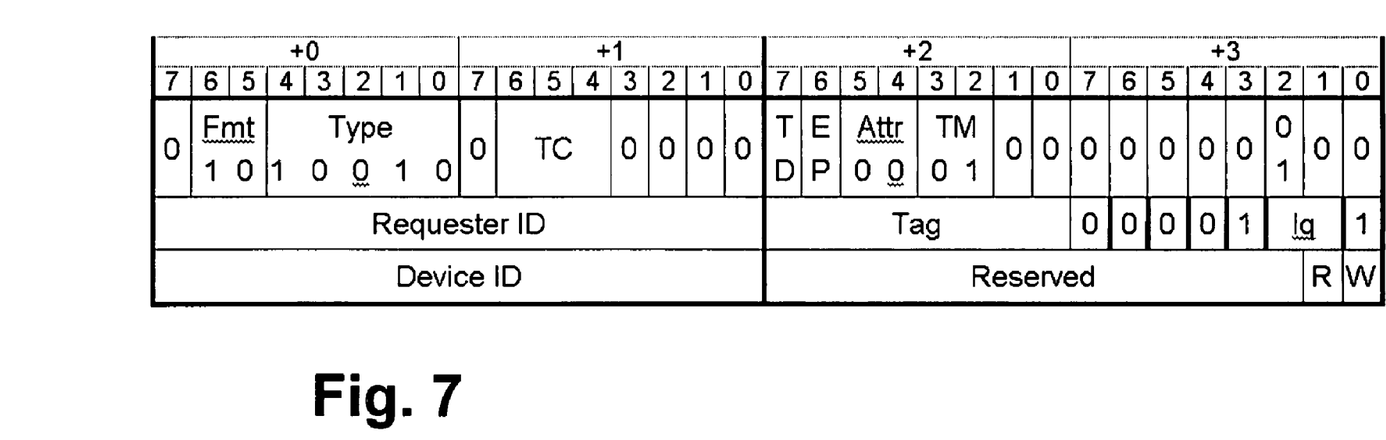

The TA sends the TranslationResponse message in reply to any request that the TA receives with an AT of TranslationRequest if the translation is valid. The TA may send this if the translation is not valid in which case, the R and W bits in the physical address will be 00. An example format for the Translation Response message header is illustrated in FIG. 7.

The Requester ID will be set to the ID of the TA. The Device ID will be the ID of the device that sent the initial request (not the address of an intermediate ATC). The Tag field is set to the Tag value of the initial request.

An ATC that receives a TranslationResponse message will forward this message if the BusesWithATC bit is set for the bus indicated in Device ID.

TABLE 2

| Field Encodings | |
| --- | --- |
| Field | Meaning |
| Iq | Identity Qualifier: This field indicates which portions of the Bus/Dev/Fn are significant in qualifying the Source ID. The coding for the Iq field is: |

TABLE 2-continued

| Field Encodings | |
| --- | --- |
| Iq | Meaning |
| 00b | Translation applies to all Bus/Dev/Fn located downstream of the ATC. |
| 01b | Translation applies to all Dev/Fn with the same Bus number as Device ID |
| 10b | Translation applies to all Fn with the same Bus/Dev number as Device ID |
| 11b | Translation applies only to Bus/Dev/Fn indicated in Device ID |

| RW | | |
| --- | --- | --- |
| R | W | Meaning |
| 0 | 0 | Either no translation exists for the indicated page or access to this page is not allowed. A message body may follow a header with this value (the Length field of the header will indicate if the body is present). It is optional for a TA to send a TranslationResponse message with this setting. |
| 0 | 1 | Write access is allowed but not read access. If a write access is received, the address is converted and forwarded with AT set to Translated. If a read request is received then the request is forwarded without modification. |
| 1 | 0 | Read access is allowed but not write access. If a read access is received, the address is converted and forwarded with AT set to Translated. If a write request is received then the request is forwarded without modification. |
| 1 | 0 | Read and write access are allowed. If a read or write access is received, the address is converted and forwarded with AT set to Translated. |

Figure 8:
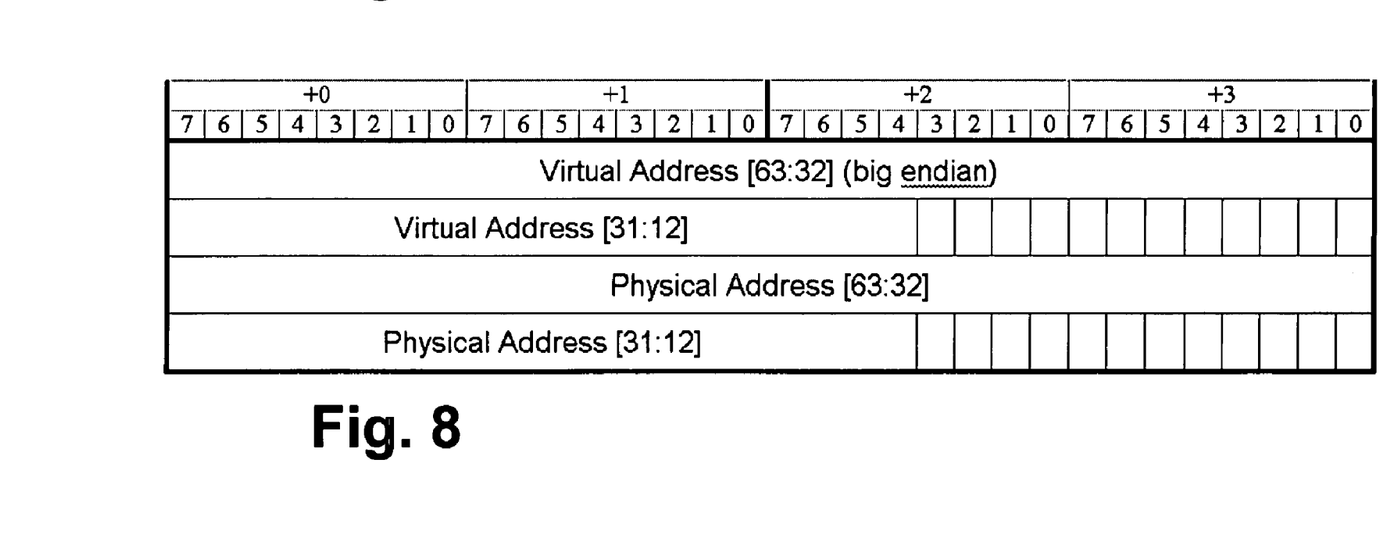

When the length field is 4, then a data payload with the example format shown in FIG. 8 follow the Translation Response message header. It is not required that an ATC be able to do an associative lookup based on all the variables of Bus/Dev/Fn. For example, assume that an ATC only does fully qualified associative lookups (virtual address plus Bus, Dev and Fn). This could cause the ATC to contain an entry for each Fn even though all Fn's on a specific Bus/Dev use the same table. The degree to which an ATC can qualify the Source ID when it is doing a lookup will affect the actions of the ATC when it is processing an Invalidate or InvalidatePage message.

If the ATC uses a content addressable memory (CAM) A CAM is accessed by its contents. There is a tag portion and a data portion. The semantics of a CAM are give me the entry that had "this value" in its tag field. With masking capabilities, it is possible to design the ATC so that it can check all possible uses of the source ID in three cycles. This is done by saving the Iq bits in the CAM. On the first cycle, Iq check is set to 11b and the virtual address, Bus, Dev and Fn are applied. If there is any match, there will only be one. On the next cycle, Iq check is set to 10b and the virtual address, Bus and Dev are applied with the Fn masked (Fn is don't care). Again, if there is a match, only one entry will match. If the address still has not compared, set Iq check to 01b with Dev masked. There should only be one match. This algorithm can be applied with any order of Iq as long as the appropriate Dev and Fn are masked.

When an entry in a translation table changes, any ATC that may contain a copy of the translation must be informed of the change. This is accomplished by having the TA send an Invalidate or InvalidatePage message. The Invalidate message clears groups of translations associated with a device. The InvalidatePage message invalidates a specific page translation associated with a device.

When the invalidate operation is complete, an ATC may have to return an InvalidateComplete message. If the ATC is the most downstream device that may contain a translation that is being invalidated, then it will return the Invalidate-Complete message.

Figure 9:
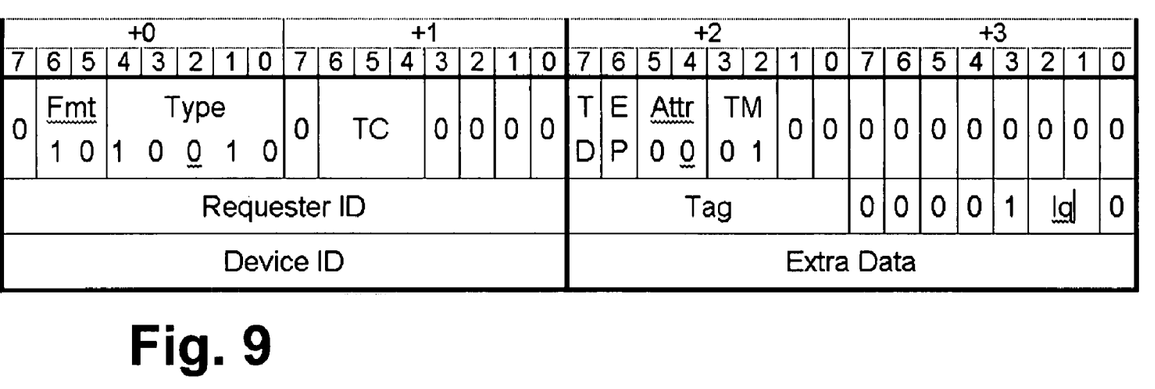

This message is generally used when the entire translation table for a Bus, Dev, and/or Fn is being changed. The Invalidate Message has no data payload and an example format is illustrated in FIG. 9.

The Extra Data field is available to allow the TA to add additional qualifiers for tracking the progress of the invalidate operation. This field is opaque to the ATC.

The Identity Qualifier (Iq) field indicates what portion of the DeviceID is used to determine the entry or entries to be invalidated as follows:

TABLE 3

Identity Qualifier Field Encodings

| Iq | Meaning |
| --- | --- |
| 00b | Invalidate all entries. |
| 01b | Invalidate all entries the same Bus number as Device ID |
| 10b | Invalidate all entries with the same Bus and Dev numbers as Device ID. |
| 11b | Invalidate all entries with the same Bus, Dev, and Fn numbers as Device ID. |

Figure 10:
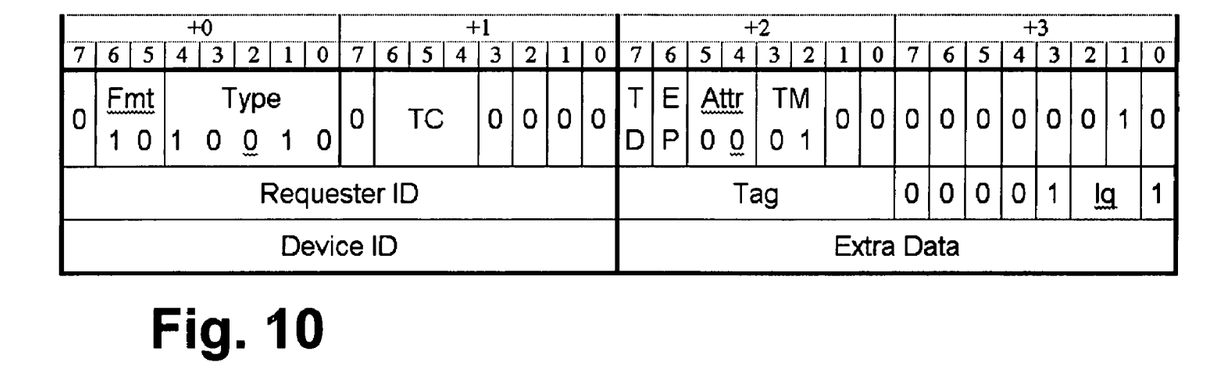

If the invalidate request is for a specific page, then the Invalidate Page Message has an 8-byte data payload that contains the virtual address of the page being invalidated. The virtual address may be specific to a Bus/Dev/Fn, a Bus/Dev, a Bus, or non-specific. An example format of the InvalidatePage Message is illustrated by FIG. 10.

The Identity Qualifier (Iq) filed indicates what portion of the Device ID is used to determine the entry to be invalidated as follows:

TABLE 4

Identity Qualifier Field Encodings

| Iq | Meaning |
| --- | --- |
| 00b | Invalidate any entry with the indicated virtual address regardless of Bus/Dev/Fn. |
| 01b | Invalidate any entry with the indicated virtual address and the same Bus number as Device ID (i.e. ignore Dev/Fn). |
| 10b | Invalidate any entry with the indicated virtual address and the same Bus and Dev as Device ID (i.e. ignore Fn). |
| 11b | Invalidate any entry with the indicated virtual address and the same Bus, Dev, and Fn numbers as Device ID. |

Figure 11:
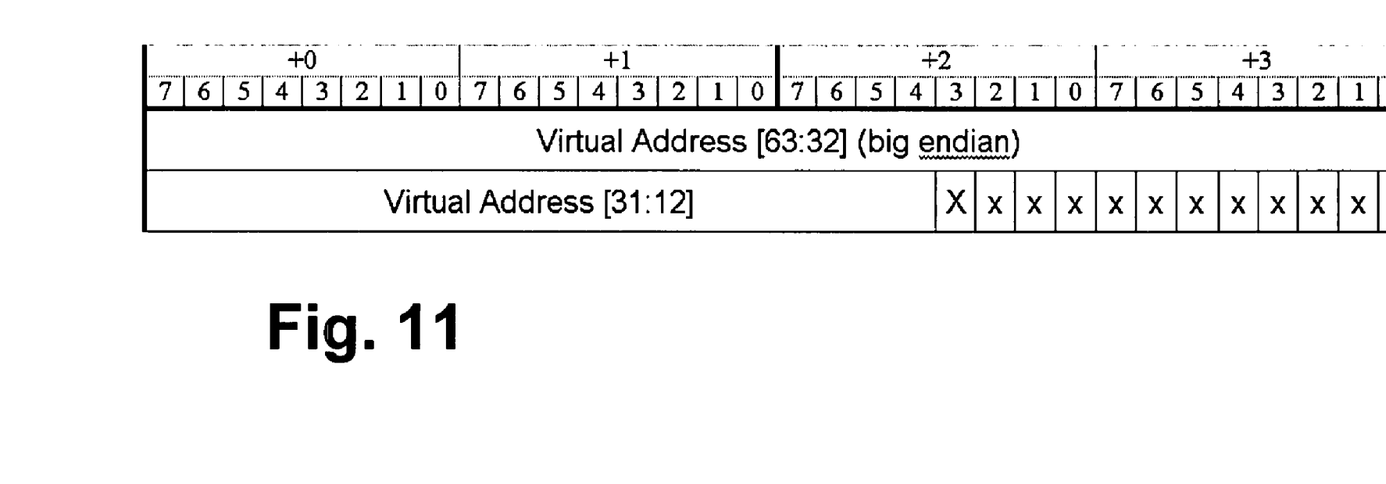

An example data payload format for the InvalidatePage message is illustrated in FIG. 11. When the ATC receives and InvalidatePage message, it checks its cache in a manner that is consistent with the way in which it associates Bus/Dev/Fn's. Using the example for TranslationResponse, an ATC might be designed to only do lookups based on fully qualified Device ID's (Bus/Dev/Fn) even though a TranslationResponse may indicate that the translation is used for all functions on a Bus/Dev. If the InvalidatePage indicates that the page is common among all Fn's (Iq=10b) then the ATC may have to try to each value of Fn, looking for matches. If the translation is for a Bus, then all 256 possible Dev/Fn combinations may have to be checked (this assumes that the device doesn't keep any other record of the Dev/Fn numbers used on a particular bus).

Figure 12:
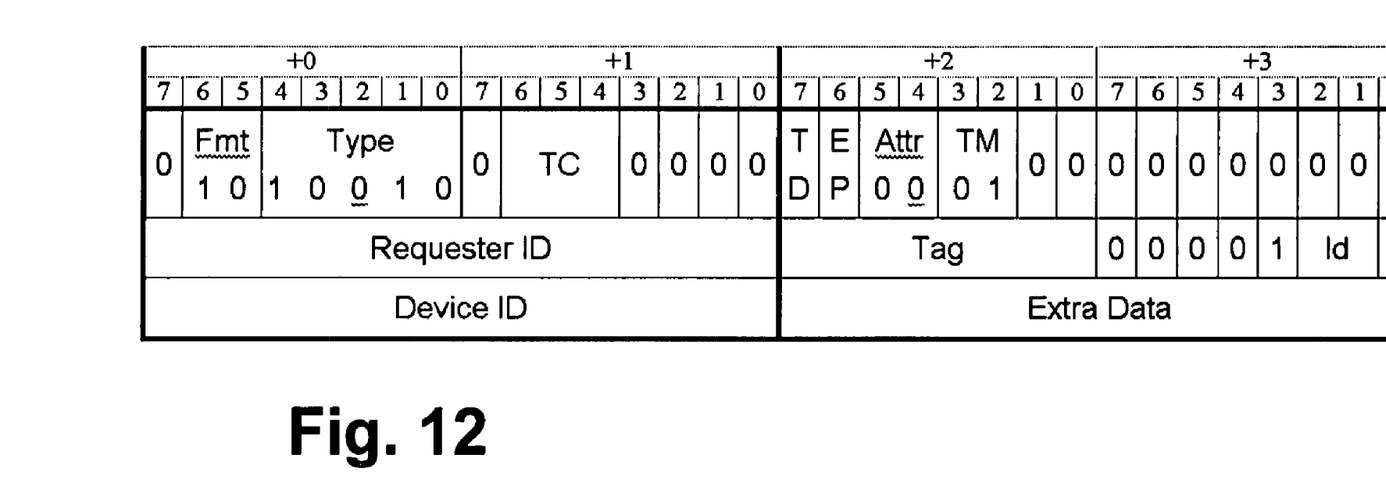

The most remote ATC that can have a translation for a Bus is responsible for sending the InvalidateComplete message back to the root complex. An ATC determines if there is a more remote ATC for a Bus by checking the ATC Attached structure to see if the bit corresponding to the Bus number in the invalidate is set. An example format for the InvalidateComplete Message is illustrated in FIG. 12.

The Requestor ID and Device ID fields of the Invalidate/InvalidatePage message are exchanged to create the Device ID and Requestor ID fields of the InvalidateComplete message. The Tag, Id and Extra Data fields are copied from the Invalidate/InvalidatePage messages. An implementation of helping software track the invalidate is to let system software specify the Tag value that is to be used in the invalidate operation and provide a 256-bit (or 256-byte) vector in the TA. Before software initiates the invalidation operation, it sets the bit/byte Tag. When the invalidation is complete, hardware clears the Tag bit/byte.

This 256-bit structure is used to control whether an ATC will cache translations for requests from a specific bus number. If the bit is set, then the ATC will cache the translation, otherwise, it will not.

This bit vector is referenced when a request is received from a downstream facing port, or when a translation response message is received from the root complex. If a request comes from a device on a Bus that is not cached (TEV not set), then the ATC will forward the request upstream without modification. If a TranslationResponse message is received for a bus that is not cached by this ATC, then the ATC will forward the message downstream not make an entry in its translation cache (the TranslatonResponse is only forwarded if the ATC Attached bit is set for the indicated bus number).

This 256-bit structure is used to indicate if a translation request has been received from a specific bus number.

If a translation request is received from a downstream bus, the corresponding bit will be set in this structure. When any translation related message is received from upstream, the message will be forwarded to the indicated bus if the corresponding bit is set.

Notably, when a device is given a new bus number, it should not have any outstanding DMA requests since the response can't be delivered. This means that it might be safe to assume that it is OK to purge the ATC in a device and all ATC's that contain entries for the old bus number. When this is done, the ATC Attached bits should also be cleared so that the new device with the bus number will not receive unexpected translation messages.

It may not be optimal for multiple ATC's to be caching translations for the same bus. When a memory request is received with TranslationRequest set in the AT field, the ATC will check its Translation Enable Vector to see if it is caching translations for that bus. If so, it will check its cache to see if it contains translation for the address. If it does, it will change the address in the transaction and forward it to the root complex. It will also return a translation response message on the port on which the translation request was received. The ATC will also set the ATC Attached bit for the bus number associated with the requester ID.

Elements of embodiments of the invention described below may be implemented by hardware, firmware, software or any combination thereof. The term hardware generally refers to an element having a physical structure such as electronic, electromagnetic, optical, electro-optical, mechanical, electro-mechanical parts, while the term software generally refers to a logical structure, a method, a procedure, a program, a routine, a process, an algorithm, a formula, a function, an expression, and the like. The term firmware generally refers to a logical structure, a method, a procedure, a program, a routine, a process, an algorithm, a formula, a function, an expression, and the like that is implemented or embodied in a hardware structure (e.g., flash memory, ROM, EROM). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include programs, code, data, files, and the like.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, and the like. A software module is coupled to another module to receive variables, parameters, arguments, pointers, etc. and/or to generate or pass results, updated variables, pointers, and the like. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

Embodiments of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed.

Those skilled in the art also will readily appreciate that many additional modifications are possible in the exemplary embodiment without materially departing from the novel teachings and advantages of the invention. Any such modifications are intended to be included within the scope of this invention as defined by the following exemplary claims.

What is claimed is:

1. A system for storing data in a memory, comprising:
   a bus controller component that controls access between a CPU and a memory address space;
   a plurality of bus components connected to said bus controller over a bus, said bus components addressable as a memory mapped address within said address space; and
   an first address translation table stored on at least one of said plurality of bus components, said address translation table storing a translation between a virtual address and a real address and wherein an second address translation table storing a translation between a virtual address and a real address is added to at least one other of said plurality of bus components.

2. The system as recited in claim 1 wherein said at least one component translates said virtual address to a corresponding real address using the stored translation in the translation table.

3. The system as recited in claim 2 wherein said translating component communicates with said plurality of bus components.

4. The system as recited in claim 1 wherein a mechanism for invalidating said table is implemented over the bus connecting the bus component to the address translation table.

5. The system as recited in claim 4 wherein the mechanism comprises passing a message to the bus component storing the address translation table.

6. The system as recited in claim 1 wherein the bus type is PCI Express.

7. The system as recited in claim 1 wherein the real address is a 64-bit address.

8. A method for storing data in a memory, comprising:
   coupling a plurality of bus components to a bus;
   storing an address translation in a cache on said plurality of bus components;
   translating a memory address directed to said bus component from a virtual address to a real address according to the address translation stored on a bus component;
   passing a message to a select bus component of the plurality of bus components wherein said message contains information indicative of an invalid address translation stored in the cache of the select bus component and wherein said select bus component comprises a switch.

9. The method as recited in claim 8 wherein the number of bus components having an address translation cache is dynamically determined according to the number of bus components.

10. The method as recited in claim 8 wherein said message is used by a translation agent to invalidate the address translation stored in the cache.

11. The method as recited in claim 10 wherein one of the bus components sends a message to any of the remaining ones of the plurality of bus components coupled to it wherein said message contains information indicative of an invalid address translation.

12. The method as recited in claim 11 wherein each bus component that receives the message to invalidate the address translation stored in its cache invalidates the cache and send a message back to the select bus component indicative of the performance of a cache invalidation.

13. The method as recited in claim 8 wherein the bus component is a shared by a plurality of devices.

14. The method as recited in claim 8 comprising maintaining a bus number on the switch for which address translations should be cached.

15. A method for use in maintaining a plurality of caches in a bus system, comprising:
    tagging an address type field in a memory request message, said address type indicating whether an address is a real address or a virtual address;
    forwarding the memory request message to a bus component have an address translation cache; and
    using the cache to translate the address to a real address when the address type field indicates that the address is a virtual address;
    receiving an invalidate cache request wherein the bus component is a switch.

16. The method as recited in claim 15 comprising sending an invalidate request to second bus components that communicate with a system by way of the bus component.

17. The method as recited in claim 15 comprising invalidating the address translation cache on the bus component.

18. The method as recited in claim 15 wherein the bus component receives messages according to a PCI Express bus protocol.

19. The method as recited in claim 15 wherein the number of bus components having an address translation cache is dynamically determined according to the number of bus components.

20. The method as recited in claim 15 wherein the bus component is a shared by a plurality of devices.

* * * * *